(12) United States Patent
Li

(10) Patent No.: US 8,531,767 B2
(45) Date of Patent: Sep. 10, 2013

(54) ZOOM LENS

(75) Inventor: Dayong Li, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 130 days.

(21) Appl. No.: 13/182,775

(22) Filed: Jul. 14, 2011

(65) Prior Publication Data

US 2012/0062993 A1  Mar. 15, 2012

(30) Foreign Application Priority Data

Sep. 10, 2010  (JP) ................................. 2010-203703

(51) Int. Cl.
G02B 27/64  (2006.01)
G02B 15/14  (2006.01)

(52) U.S. Cl.
CPC .............. G02B 27/646 (2013.01); G02B 15/14 (2013.01); *G02B 27/64* (2013.01)
USPC ............................. 359/557; 359/687; 359/686

(58) Field of Classification Search
USPC .......................... 359/554–557, 676, 686–687
See application file for complete search history.

(56) References Cited

U.S. PATENT DOCUMENTS

| | | | |
|---|---|---|---|
| 6,646,804 B2 | 11/2003 | Harada | |
| 6,693,750 B2* | 2/2004 | Sato | 359/687 |
| 6,891,680 B2* | 5/2005 | Sato | 359/687 |
| 2003/0133200 A1 | 7/2003 | Sato | |
| 2009/0086321 A1* | 4/2009 | Mizuguchi et al. | 359/557 |
| 2011/0188117 A1* | 8/2011 | Arakawa et al. | 359/557 |

FOREIGN PATENT DOCUMENTS

| | | |
|---|---|---|
| JP | 2002-162564 A | 6/2002 |
| JP | 2003-344766 A | 12/2003 |
| JP | 2010-44372 A | 2/2010 |

* cited by examiner

*Primary Examiner* — Thong Nguyen
(74) *Attorney, Agent, or Firm* — Foley & Lardner LLP

(57) ABSTRACT

A zoom lens includes, sequentially from an object side, a first lens group having a positive refractive power; a second lens group having a negative refractive power; a third lens group having a positive refractive power; and a fourth lens group having a positive refractive power. Zoom is performed by moving the second and the third lens groups in a direction along an optical axis. The fourth lens group consists of, sequentially from the object side, a front group having a positive refractive power, an intermediate group configured by a cemented lens formed by a positive lens and a negative lens and having an overall refractive power that is negative, and a rear group having a positive refractive power. Blur is corrected by moving the intermediate group in a direction that is substantially orthogonal to the optical axis.

4 Claims, 12 Drawing Sheets

ZOOM LENS

BACKGROUND OF THE INVENTION

1. Field of the Invention

The present invention relates to a zoom lens ideal for digital still and motion cameras (DSMC), single-lens reflex cameras, and the like.

2. Description of the Related Art

Recently, in DSMCs and single-lens reflex cameras, zoom lenses are used in which a portion of the lenses in the first group are moved along the optical axis during focusing (see, for example, Japanese Patent Application Laid-Open Publication Nos. 2002-162564 and 2003-344766). Zoom lenses are also used in which a third or a fourth group configured by plural intermediate diameter lenses is moved along the optical axis during focusing (see, for example, Japanese Patent Application Laid-Open Publication No. 2010-44372).

For example, the zoom lens recited in Japanese Patent Application Laid-Open Publication No. 2002-162564 has, sequentially from an object side, a front lens component that includes plural lenses for performing zoom and focusing; and a rear lens component that includes a relay lens group having an imaging function. The rear lens component has, sequentially from the object side, a lens group A having a positive refractive power, a lens group B having a negative refractive power and movable so as to have a component in a direction orthogonal to the optical axis, and a lens group C having a positive refractive power, where the movement of the lens group B so as to have a component in a direction orthogonal to the optical axis causes displacement of the image.

The zoom lens recited in Japanese Patent Application Laid-Open Publication No. 2003-344766 includes, sequentially from the object side, a positive first lens group, a negative second lens group, a positive third lens group, and a positive fourth lens group, where the second lens group and the third lens group are moved in a direction along the optical axis to perform zooming. The first lens group is configured sequentially by a positive front group and a rear group having a stronger refractive power than the front group, where the rear group is moved in a direction along the optical axis to perform near focus and the front group is configured sequentially by a negative meniscus lens having a convex surface facing toward the object side, a positive lens whose object-side surface is convex, and a positive lens whose object-side surface is convex. The rear group is configured sequentially by a negative meniscus lens having a convex surface facing toward the object side, and a positive lens component.

The zoom lens recited in Japanese Patent Application Laid-Open Publication No. 2010-44372 has a first lens group having a positive refractive power and disposed farthest on the object side, a second lens group disposed on the image plane side of the first lens group, a $G_n$ lens group disposed farthest on the image plane side, a $G_{n-1}$ lens group disposed on the object side of the $G_n$ lens group, and at least 1 lens group disposed between the second lens group and the $G_{n-1}$ lens group. When zoom is performed, the first lens group and the $G_n$ lens group are fixed. When focusing is performed, at least 1 lens group disposed between the second lens group and the $G_{n-1}$ lens group is moved and at least a portion of the $G_n$ lens group is moved so as to have a component in a direction substantially orthogonal to the optical axis.

Nonetheless, although the anti-blur coefficient (in blur correction, the ratio of the shift amount of the image point and the shift amount of the anti-blur group) is large for the zoom lenses disclosed in Japanese Patent Application Laid-Open Publication Nos. 2002-162564 and 2003-344766, the anti-blur group is configured by 2 negative lenses and 1 positive lens and therefore, is heavy. To move the heavy anti-blur group, a strong driving power is demanded of the actuator that drives the anti-blur group. As a result, a problem arises in that the power consumption of the actuator becomes large.

Further, the zoom lens disclosed in Japanese Patent Application Laid-Open Publication No. 2010-44372 has an anti-blur group that is configured by 2 lenses and although this zoom lens having an anti-blur group configured by 2 lenses is thus, excellent on the point of the anti-blur group being light weight, since the anti-blur coefficient of the anti-blur group is small, even when a minimal image point shift is to be corrected, the anti-blur group must be shifted a lot. Consequently, the driving amount of the actuator that drives the anti-blur group becomes large and as a result, a problem arises in that the power consumption of the actuator becomes large.

SUMMARY OF THE INVENTION

It is an object of the present invention to at least solve the above problems in the conventional technologies.

A zoom lens according to one aspect of the present invention includes, sequentially from an object side, a first lens group having a positive refractive power; a second lens group having a negative refractive power; a third lens group having a positive refractive power; and a fourth lens group having a positive refractive power. Zoom is performed by moving the second lens group and the third lens group in a direction along an optical axis. The fourth lens group consists of, sequentially from the object side, a front group having a positive refractive power, an intermediate group configured by a cemented lens formed by a positive lens and a negative lens or a cemented lens formed by a negative lens and a positive lens and having an overall refractive power that is negative, and a rear group having a positive refractive power. Blur is corrected by moving the intermediate group in a direction that is substantially orthogonal to the optical axis, and a conditional expression (1) $1.85<|Ft \times F4M/(F4F \times F4R)|<4$ is satisfied, where Ft represents overall optical system focal length, at a telephoto edge, in an infinity focus state, F4F represents the focal length of the front group of the fourth lens group, F4M represents the focal length of the intermediate group of the fourth lens group, and F4R represents the focal length of the rear group of the fourth lens group.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
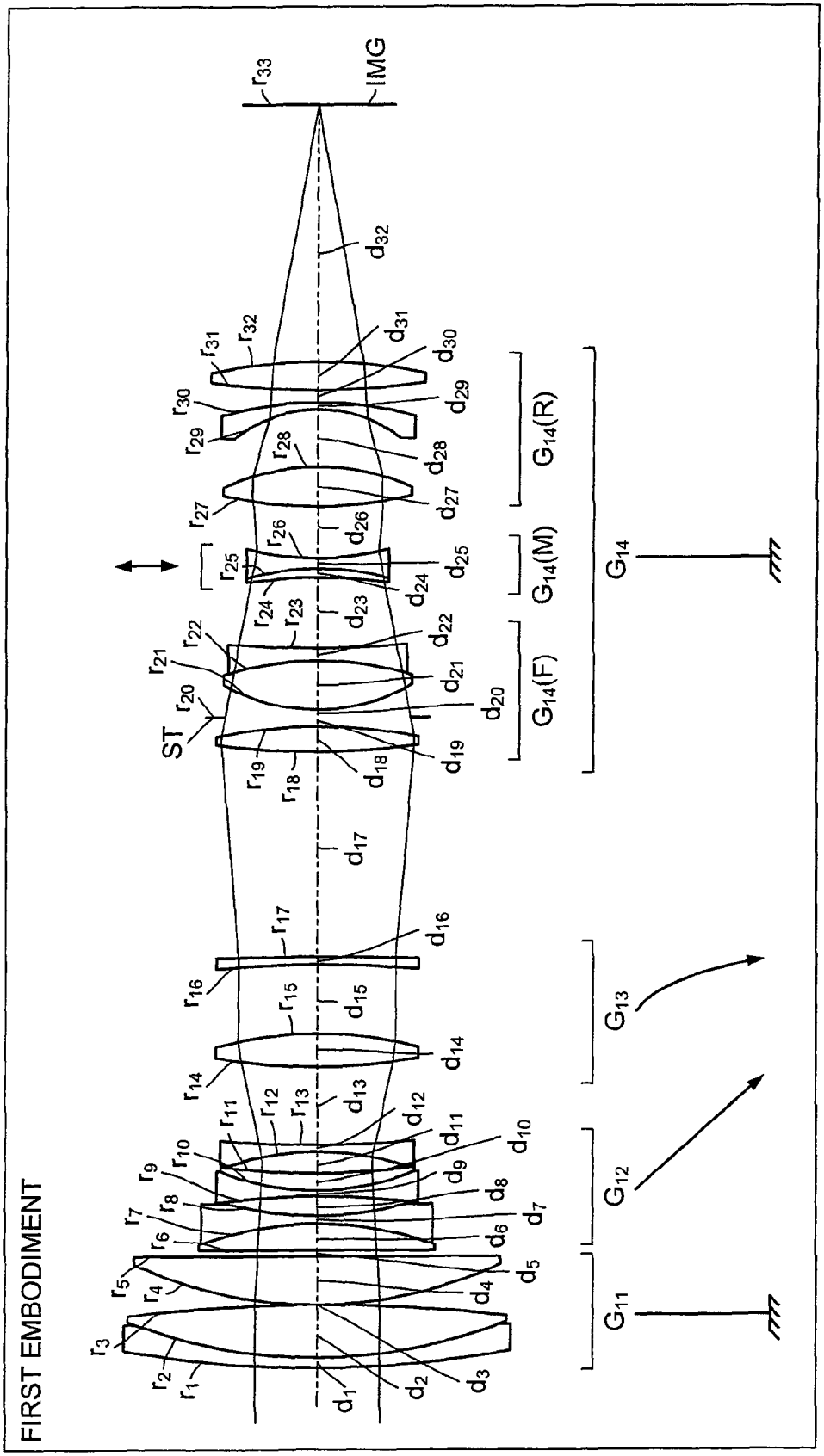
FIG. 1 depicts a cross-sectional view (along the optical axis) of a zoom lens according to a first embodiment.

Referring to the accompanying drawings, exemplary embodiments according to the present invention are explained in detail below.

A zoom lens according to the present invention includes, sequentially from an object side, a first lens group having a positive refractive power, a second lens group having a negative refractive power, a third lens group having a positive refractive power, and fourth lens group having a positive refractive power. Further, the second lens group and third lens group are moved in a direction along the optical axis, whereby zoom is performed from a wide angle edge to a telephoto edge.

An object of the present invention is to provide a zoom lens that maintains high optical performance and facilitates reductions in the size, weight and anti-blur shift amount of the anti-blur group, and that has an excellent blur correction function. To achieve this object, various conditions are set as indicated below.

In the zoom lens according to the present invention, the fourth lens group consists of, sequentially from an object side, a front group having a positive refractive power; an intermediate group configured by a cemented lens formed by a positive lens and a negative lens or a cemented lens formed by a negative lens and a positive lens, and having an overall refractive power that is negative; and a rear group having a positive refractive power. Blur (image point shift) correction is performed by moving the intermediate group in a direction orthogonal to the optical axis. The zoom lens preferably satisfies the following conditional expression, where Ft represents overall optical system focal length, at the telephoto edge, in an infinity focus state; F4F represents the focal length of the front group of the fourth lens group; F4M represents the focal length of the intermediate group of the fourth lens group; and F4R represents the focal length of the rear group of the fourth lens group.

$$1.85 < |Ft \times F4M/(F4F \times F4R)| < 4 \tag{1}$$

Conditional expression (1) represents a condition for maintaining high optical performance and facilitating reductions in the size and weight of the intermediate group of the fourth lens group. Below the lower limit of conditional expression (1), the refractive power (reciprocal of focal length) of the front group and that of the rear group of the fourth lens group become too weak, whereby the effective diameter of the intermediate group, which is the anti-blur group, has to be increased, making reductions in the size and weight of the anti-blur group difficult. On the other hand, above the upper limit of conditional expression (1), although the effective diameter of the intermediate group can be made smaller, the correction of various types of aberration becomes difficult.

More favorable results can be expected if conditional expression (1) is satisfied within the following range.

$$1.85 < |Ft \times F4M/(F4F \times F4R)| < 2.5 \tag{1}'$$

By satisfying the range prescribed by conditional expression (1)', on top of realizing reductions in the size and weight of the anti-blur group, the optical performance of the anti-blur group can be improved further.

The zoom lens according to the present invention preferably satisfies the following conditional expression, where AT is the anti-blur coefficient for the intermediate group of the fourth lens group.

$$-2.0 < AT < -1.3 \tag{2}$$

Furthermore, $AT=(1-\beta M) \times \beta R$, where $\beta M$ represents lateral magnification of the intermediate group of the fourth lens group, at the telephoto edge and $\beta R$ represents lateral magnification of the rear group of the fourth lens group, at the telephoto edge.

Conditional expression (2) represents a condition for maintaining high optical performance and reducing the anti-blur shift amount of the anti-blur group. Below the lower limit of conditional expression (2), although the shift amount of the anti-blur group during blur correction can be reduced, the refractive power of the anti-blur group becomes strong, making the correction of various types of aberration difficult. On the other hand, above the upper limit of conditional expression (2), although advantageous in correcting various types of aberration, the shift amount of the anti-blur group increases, increasing the driving amount of the actuator that drives the anti-blur group and hence, increasing the power consumption of the actuator.

More favorable results can be expected if conditional expression (2) is satisfied within the following range.

$$-1.6 < AT < -1.3 \tag{2}'$$

By satisfying the range prescribed by conditional expression (2)', the optical performance of the anti-blur group can be further improved, on top of reducing the shift amount of the anti-blur group during blur corrections.

In the zoom lens according to the present invention, the intermediate group of the fourth lens group includes at least 1 aspheric surface and compared to a spherical surface having a paraxial radius of curvature, the aspheric surface has a shape where the positive refractive power toward the lens periphery from the optical axis becomes stronger or the negative refractive power becomes weaker. Further, the zoom lens preferably satisfies the following conditional expression, where $\Delta S$ represents the deviation of the paraxial radius of curvature at the height of the effective diameter of the aspheric surface of the intermediate group and aspheric surface shape and $\phi S$ represents the effective diameter of the aspheric surface of the intermediate group.

$$0.1 < |100 \times \Delta S/\phi S| < 1.0 \tag{3}$$

Conditional expression (3) represents a condition for improving the optical performance of the intermediate group (anti-blur group) of the fourth lens group. Below the lower limit of conditional expression (3), an aspheric surface cannot be formed among the intermediate group, whereby the correction of various types of aberration at the intermediate group cannot be performed. On the other hand, above the upper limit of conditional expression (3), coma aberration correction becomes difficult.

More favorable results can be expected if conditional expression (3) is satisfied within the following range.

$$0.2 < |100 \times \Delta S/\phi S| < 0.5 \qquad (3)'$$

By satisfying the range prescribed by conditional expression (3)', coma aberration can be favorably corrected and high optical performance can be maintained.

As described, the zoom lens according to the present invention, the intermediate group (anti-blur group) of the fourth lens group is configured by 2 lenses, whereby a reduction in the weight of the anti-blur group is facilitated. By satisfying conditional expression (1), the focal lengths of the lens groups preceding and subsequent to the anti-blur group become appropriate, high optical performance is maintained, and the effective diameter of the anti-blur group is reduced, enabling reductions in the size of the anti-blur group to be facilitated. By satisfying conditional expression (2), the lateral magnification of the anti-blur group and that of the lens groups subsequent thereto become appropriate, enabling the anti-blur coefficient to be sufficiently large. As a result, optical performance can be maintained and the anti-blur shift amount of the anti-blur group during blur correction can be reduced. By satisfying conditional expression (3) (or conditional expression (3)'), the optical performance of the anti-blur group can be further improved. Thus, according to the zoom lens of the present invention, reductions in the size, weight and anti-blur shift amount of the anti-blur group can be facilitated, whereby even with a small actuator, blur correction can be performed quickly, promoting actuator power savings without deterioration in optical performance.

FIG. 1 depicts a cross-sectional view (along the optical axis) of the zoom lens according to a first embodiment. The zoom lens includes sequentially from an object side (object not depicted), a first lens group $G_{11}$ having a positive refractive power, a second lens group $G_{12}$ having a negative refractive power, a third lens group $G_{13}$ having a positive refractive power, and a fourth lens group $G_{14}$ having a positive refractive power. Further, at an imaging plane IMG, the light receiving surface of an imaging element, such as a CCD and CMOS, is disposed.

The fourth lens group $G_{14}$ consists of, sequentially from the object side, a front group $G_{14}(F)$ having a positive refractive power, an intermediate group $G_{14}(M)$ configured by a cemented lens formed by a positive lens and a negative lens and having an overall refractive power that is negative, and a rear group $G_{14}(R)$ having a positive refractive power. In the front group $G_{14}(F)$, an aperture stop ST prescribing a given aperture is disposed. Further, in the intermediate group $G_{14}(M)$, the surface farthest on the imaging plane IMG side is formed to be aspheric.

The zoom lens, by uniformly moving the second lens group $G_{12}$ and the third lens group $G_{13}$ along the optical axis, from the object side to the imaging plane IMG side, zooms from a wide angle edge to a telephoto edge. Further, by moving a portion of the third lens group $G_{13}$ in a direction along the optical axis, the zoom lens performs focusing and by moving the intermediate group $G_{14}(M)$ in a direction substantially orthogonal to the optical axis, corrects blur (performs anti-blur).

Various values related to the zoom lens according to the first embodiment are indicated below.

Focal length (mm) of entire zoom lens=71.5336 (wide angle edge) to 111.5353 (intermediate position) to 194.092 8 (telephoto edge)
Focal length (mm) of first lens group $G_{11}$=144.469
Focal length (mm) of second lens group $G_{12}$=−33.664
Focal length (mm) of third lens group $G_{13}$=90.870
Focal length (mm) of fourth lens group $G_{14}$=82.798
F number=2.9 (wide angle edge) to 2.9 (intermediate state) to 2.9 (telephoto edge)
Angle of view (2ω)=34.66° (wide angle edge) to 20.71° (intermediate state) to 12.48° (telephoto edge)
Zoom ratio=2.713
(Values Related to Conditional Expression (1))
Overall optical system focal length (Ft) (mm) at telephoto edge, in infinity focus state=194.0928
Focal length (F4F) (mm) of front group $G_{14}(F)$=62.032
Focal length (F4M) (mm) of intermediate group $G_{14}(M)$=−43.400
Focal length (F4R) (mm) of rear group $G_{14}(R)$=57.268

$|Ft \times F4M/(F4F \times F4R)|=2.3712$ (Values Related to Conditional Expression (2))
Lateral magnification (βM) of intermediate group $G_{14}(M)$ at telephoto edge=−5.133
Lateral magnification (βR) of rear group $G_{14}(R)$ at telephoto edge=−0.255
AT=−1.5639
(Where, AT=(1−βM)×βR)
(Values Related to Conditional Expression (3))
Deviation (ΔS) of paraxial radius of curvature at height of effective diameter of aspheric surface of intermediate group $G_{14}(M)$ and aspheric surface shape=−0.1151
Effective diameter (φS) of aspheric surface of intermediate group $G_{14}(M)$=26.0

$|100 \times \Delta S/\phi S|=0.4427$ $r_1=222.8728$ $d_1=2.0000$ $nd_1=1.91082$ $vd_1=35.25$ $r_2=103.7846$ $d_2=10.5000$ $nd_2=1.45860$ $vd_2=90.19$ $r_3=-300.7820$ $d_3=0.2000$ $r_4=88.4625$ $d_4=9.0000$ $nd_3=1.49700$ $vd_3=81.61$ $r_5=-9494.4089$ $d_5=1.3857$ (wide angle edge) to 31.7756 (intermediate position) to 54.1401 (telephoto edge)

$r_6=1908.7598$ $d_6=5.2000$ $nd_4=1.90366$ $vd_4=31.31$ $r_7=-69.4016$ $d_7=1.3500$ $nd_5=1.61800$ $vd_5=63.39$ $r_8=69.4016$ $d_8=3.8890$ $r_9=-141.8243$ $d_9=1.2000$ $nd_6=1.49700$ $vd_6=81.61$ $r_{10}=52.9228$ $d_{10}=3.3000$ $nd_7=1.84666$ $vd_7=23.78$ $r_{11}=111.5902$ $d_{11}=4.4169$ $r_{12}=-60.5428$ $d_{12}=1.2000$ $nd_8=1.88300$ $vd_8=40.80$ $r_{13}=174.6335$ $d_{13}=15.4455$ (wide angle edge) to 11.6391 (intermediate position) to 1.6000 (telephoto edge)

$r_{14}=113.7835$ (aspheric surface)

$d_{14}=6.3000$ $nd_9=1.58313$ $vd_9=59.46$ $r_{15}=-65.7348$ (aspheric surface)

$d_{15}=13.7091$ $r_{16}=-163.7249$ $d_{16}=1.4000$ $nd_{10}=1.92286$ $vd_{10}=20.88$ $r_{17}=-439.7863$ $d_{17}=40.4088$ (wide angle edge) to 13.8254 (intermediate position) to 1.5000 (telephoto edge)

$r_{18}=125.0060$ $d_{18}=5.1184$ $nd_{11}=1.61800$ $vd_{11}=63.39$ $r_{19}=-95.7349$ $d_{19}=1.7000$ $r_{20}=\infty$ (aperture stop)

$d_{20}=1.7000$ $r_{21}=37.0745$ $d_{21}=9.5000$ $nd_{12}=1.49700$ $vd_{12}=81.61$ $r_{22}=-65.1203$ $d_{22}=2.5000$ $nd_{13}=1.71736$ $vd_{13}=29.50$ $r_{23}=105.7968$ $d_{23}=14.2949$ $r_{24}=-88.9484$ $d_{24}=2.3000$ $nd_{14}=1.80809$ $vd_{14}=22.76$ $r_{25}=-39.7920$ $d_{25}=1.4000$ $nd_{15}=1.69350$ $vd_{15}=53.20$ $r_{26}=41.7941$ (aspheric surface) (effective diameter $\phi 26.0$)

$d_{26}=10.5167$ $r_{27}=80.4222$ $d_{27}=7.5000$ $nd_{16}=1.61800$ $vd_{16}=63.39$ $r_{28}=-44.5394$ $d_{28}=11.5916$ $r_{29}=-28.1673$ $d_{29}=1.5000$ $nd_{17}=1.71300$ $vd_{17}=53.94$ $r_{30}=-64.7347$ $d_{30}=2.5887$ $r_{31}=140.8610$ $d_{31}=5.5000$ $nd_{18}=1.56883$ $vd_{18}=56.04$ $r_{32}=-92.8595$ $d_{32}=51.37$ $r_{33}=\infty$ (imaging plane)

Constant of Cone (K) and Aspheric Coefficients (A, B, C, D, E, F)

(Fourteenth Plane)

$K=-11.9954$, $A=0$, $B=2.66677\times 10^{-7}$, $C=1.55243\times 10^{-9}$, $D=-2.91159\times 10^{-12}$, $E=2.12840\times 10^{-16}$, $F=3.53783\times 10^{-18}$ (Fifteenth Plane)

$K=-0.5492$, $A=0$, $B=1.02602\times 10^{-8}$, $C=1.30471\times 10^{-9}$, $D=-6.07503\times 10^{-13}$, $E=-3.7893\times 10^{-15}$, $F=5.96719\times 10^{-18}$ (Twenty-Sixth Plane)

Figure 2:
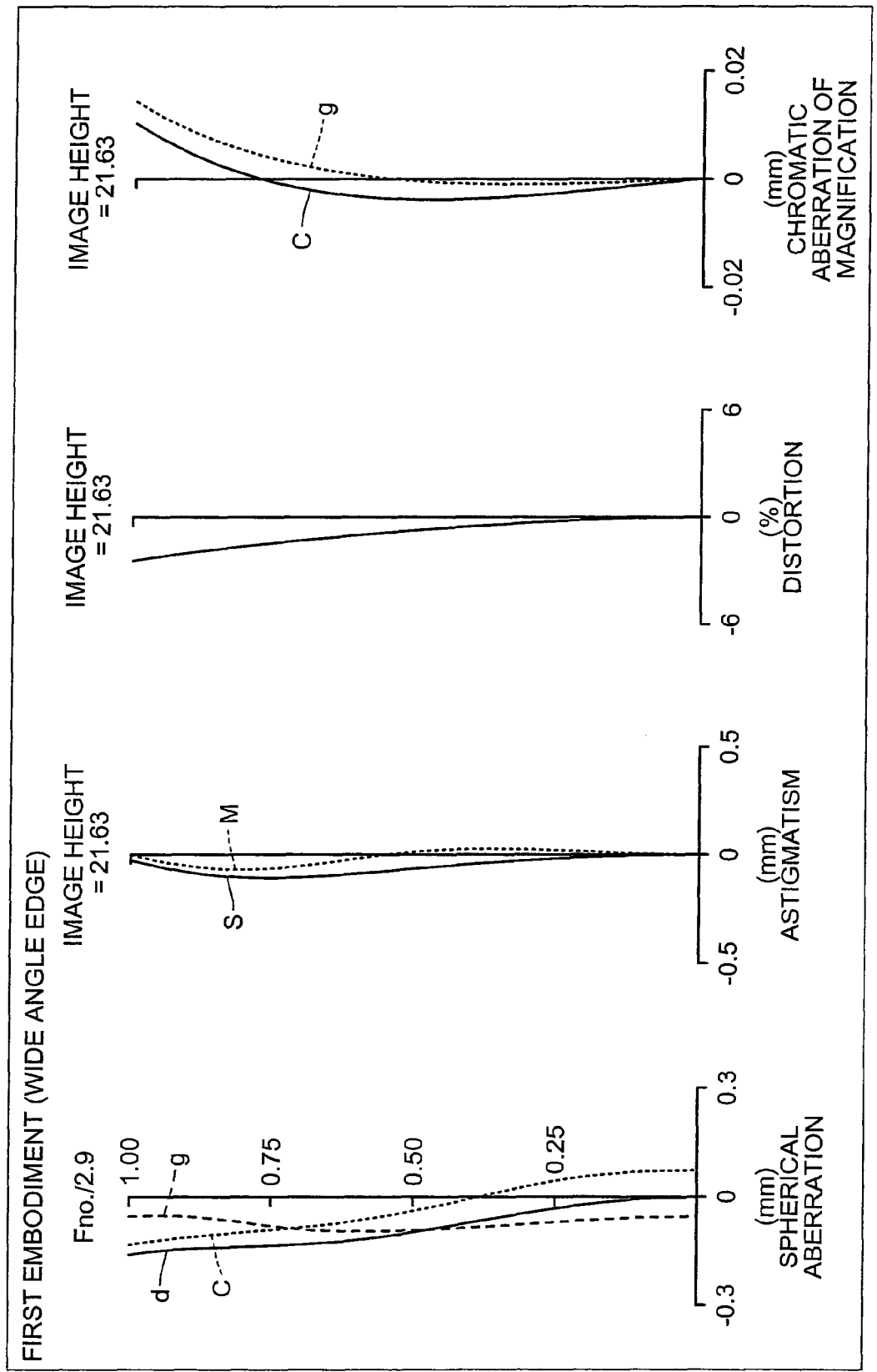
FIG. 2 is a diagram of various types of aberration at a wide angle edge of the zoom lens of the first embodiment according to the invention.
Figure 3:
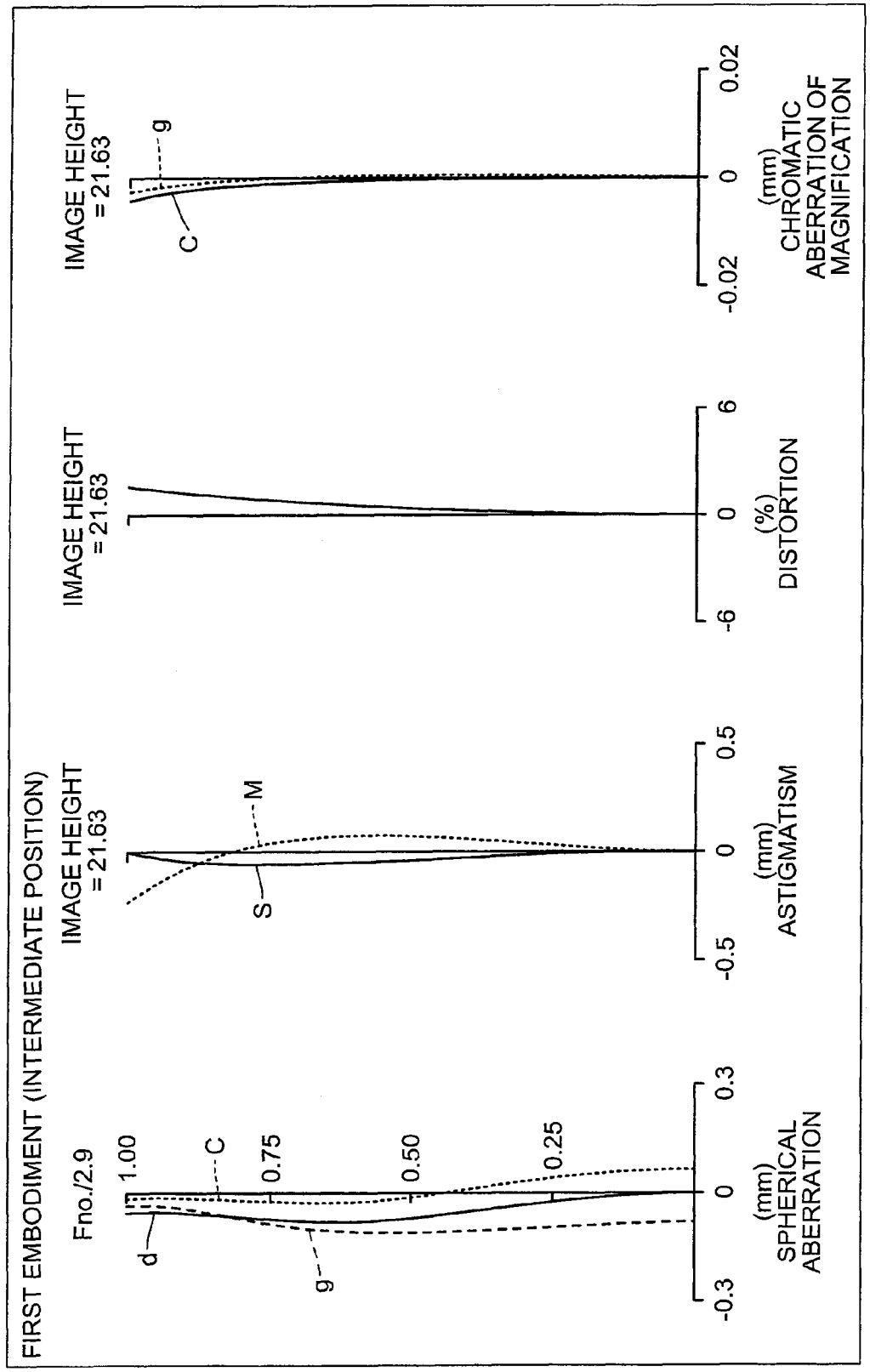
FIG. 3 is a diagram of various types of aberration at an intermediate position of the zoom lens of the first embodiment according to the invention.
Figure 4:
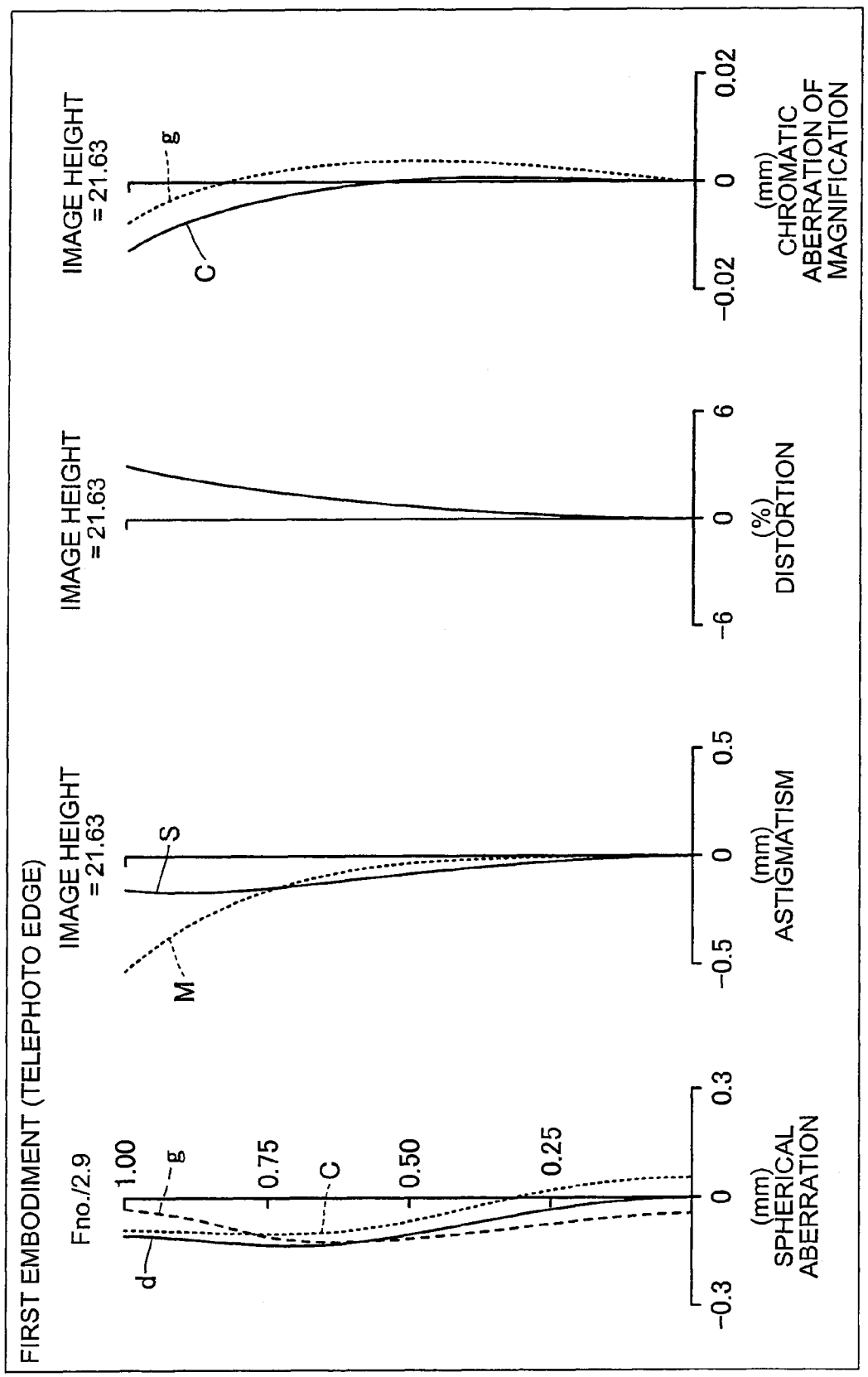
FIG. 4 is a diagram of various types of aberration at a telephoto edge of the zoom lens of the first embodiment according to the invention.

$K=-1.4774$, $A=0$, $B=-1.17887\times 10^{-6}$, $C=-1.07533\times 10^{-9}$, $D=-3.90498\times 10^{-12}$, $E=8.54852\times 10^{-15}$, $F=0$ FIG. 2 is a diagram of various types of aberration at the wide angle edge of the zoom lens of the first embodiment according to the invention; FIG. 3 is a diagram of various types of aberration at the intermediate position of the zoom lens of the first embodiment according to the invention; and FIG. 4 is a diagram of various types of aberration at the telephoto edge of the zoom lens of the first embodiment according to the invention. In the diagrams, g, d, and C represent wavelength aberration corresponding to the g-line ($\lambda=435.83$ nm), the d-line ($\lambda=587.56$ nm), and the C-line ($\lambda=656.27$ nm), respectively; and $\Delta S$ and $\Delta M$ in a portion depicting astigmatism, indicate aberration with respect to a sagittal image plane and a meridional image plane, respectively.

Figure 5:
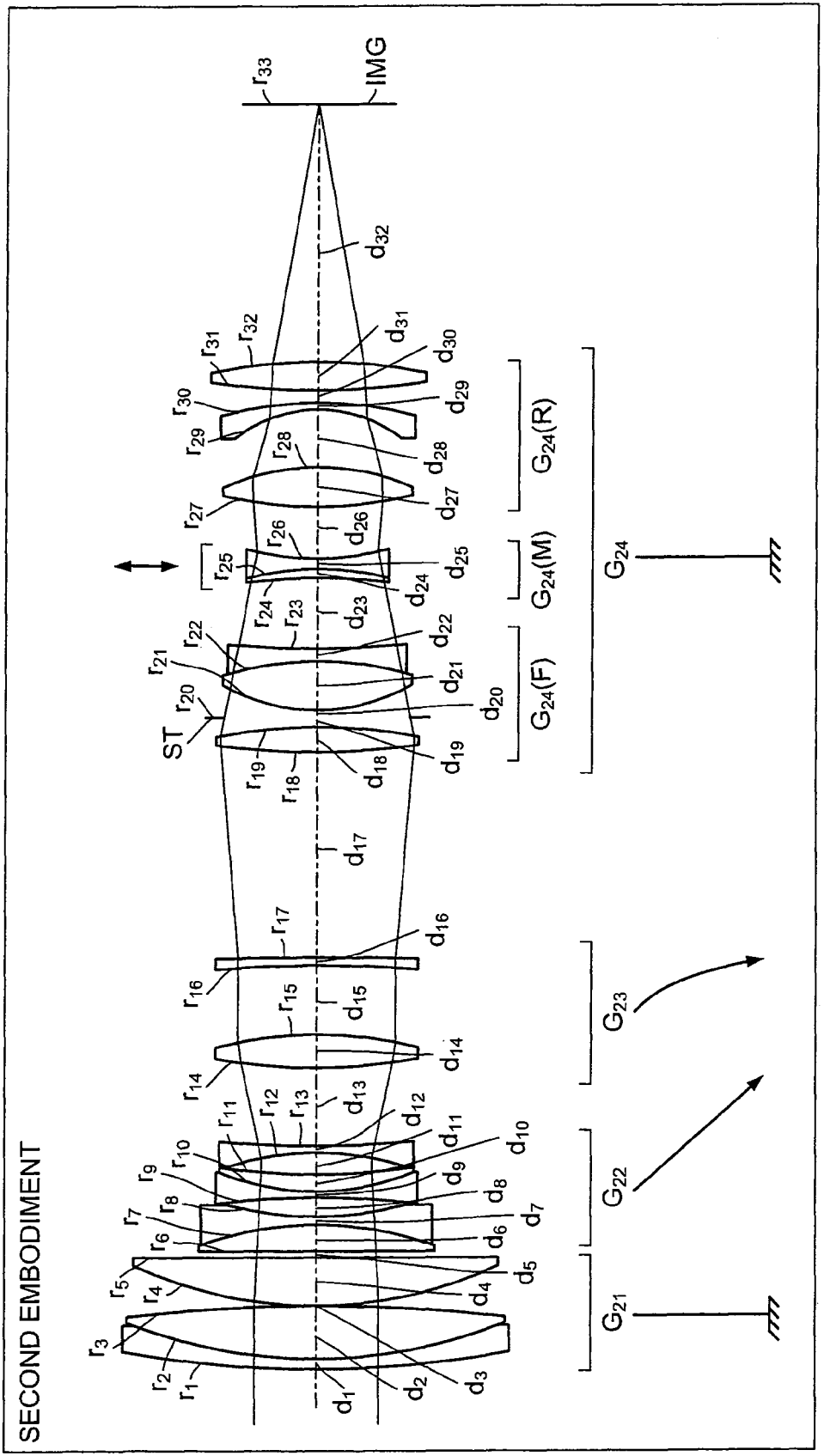
FIG. 5 depicts a cross-sectional view (along the optical axis) of the zoom lens according to a second embodiment.

FIG. 5 depicts a cross-sectional view (along the optical axis) of the zoom lens according to a second embodiment. The zoom lens includes sequentially from an object side (object not depicted), a first lens group $G_{21}$ having a positive refractive power, a second lens group $G_{22}$ having a negative refractive power, a third lens group $G_{23}$ having a positive refractive power, and a fourth lens group $G_{24}$ having a positive refractive power. Further, at the imaging plane IMG, the light receiving surface of an imaging element, such as a CCD and CMOS, is disposed.

The fourth lens group $G_{24}$ consists of, sequentially from the object side, a front group $G_{24}(F)$ having a positive refractive power, an intermediate group $G_{24}(M)$ configured by a cemented lens formed by a positive lens and a negative lens and having an overall refractive power that is negative, and a rear group $G_{24}(R)$ having a positive refractive power. In the front group $G_{24}(F)$, the aperture stop ST prescribing a given aperture is disposed. Further, in the intermediate group $G_{24}(M)$, the surface farthest on the imaging plane IMG side is formed to be aspheric.

The zoom lens, by uniformly moving the second lens group $G_{22}$ and the third lens group $G_{23}$ along the optical axis, from the object side to the imaging plane IMG side, zooms from the wide angle edge to the telephoto edge. Further, by moving a portion of the third lens group $G_{23}$ in a direction along the optical axis, the zoom lens performs focusing and by moving the intermediate group $G_{24}(M)$ in a direction substantially orthogonal to the optical axis, corrects blur (performs anti-blur).

Various values related to the zoom lens according to the second embodiment are indicated below.

Focal length (mm) of entire zoom lens=71.5209 (wide angle edge) to 117.5105 (intermediate position) to 194.068 1 (telephoto edge)
Focal length (mm) of first lens group $G_{21}$=144.087
Focal length (mm) of second lens group $G_{22}$=−33.304
Focal length (mm) of third lens group $G_{23}$=90.526
Focal length (mm) of fourth lens group $G_{24}$=82.744
F number=2.9 (wide angle edge) to 2.9 (intermediate state) to 2.9 (telephoto edge)
Angle of view (2ω)=34.66° (wide angle edge) to 20.71° (intermediate state) to 12.48° (telephoto edge)
Zoom ratio=2.713
(Values Related to Conditional Expression (1))
Overall optical system focal length (Ft) (mm), at telephoto edge, in infinity focus state=194.0681
Focal length (F4F) (mm) of front group $G_{24}(F)$=61.080
Focal length (F4M) (mm) of intermediate group $G_{24}(M)$=−43.295
Focal length (F4R) (mm) of rear group $G_{24}(R)$=58.453

|Ft×F4M/(F4F×F4R)|=2.3534

(Values Related to Conditional Expression (2))
Lateral magnification (βM) of intermediate group $G_{24}(M)$, at telephoto edge=−6.244
Lateral magnification (βR) of rear group $G_{24}(R)$, at telephoto edge=−0.216

AT=−1.5647

(Where, AT=(1−βM)×βR)
(Values Related to Conditional Expression (3))
Deviation (ΔS) of paraxial radius of curvature at height of effective diameter of aspheric surface of intermediate group $G_{24}(M)$ and aspheric surface shape=−0.1081
Effective diameter (φS) of aspheric surface of intermediate group $G_{24}(M)$=25.6

|100×ΔS/φS|=0.4223

$r_1$=222.2214

$d_1$=2.0000 $nd_1$=1.91082 $vd_1$=35.25

$r_2$=103.4753

$d_2$=10.5000 $nd_2$=1.45860 $vd_2$=90.19

$r_3$=−298.5174

$d_3$=0.2000

$r_4$=88.2603

$d_4$=8.8000 $nd_3$=1.49700 $v_3$=81.61

$r_5$=−10563.5431

$d_5$=1.2000 (wide angle edge) to 31.5776 (intermediate position) to 53.9008 (telephoto edge)

$r_6$=1009.5052

$d_6$=5.2000 $nd_4$=1.90366 $vd_4$=31.31

$r_7$=−70.2509

$d_7$=1.3500 $nd_5$=1.61800 $vd_5$=63.39

$r_8$=70.2509

$d_8$=3.7528

$r_9$=−156.3665

$d_9$=1.2000 $nd_6$=1.49700 $vd_6$=81.61

$r_{10}$=49.6801

$d_{10}$=3.3000 $nd_7$=1.84666 $vd_7$=23.78

$r_{11}$=95.2516

$d_{11}$=4.6178

$r_{12}$=−58.7772

$d_{12}$=1.2000 $nd_8$=1.88300 $vd_8$=40.80

$r_{13}$=177.1970

$d_{13}$=15.1042 (wide angle edge) to 11.3976 (intermediate position) to 1.6000 (telephoto edge)

$r_{14}$=102.9577 (aspheric surface)

$d_{14}$=6.7500 $nd_9$=1.51633 $vd_9$=64.06

$r_{15}$=−59.5060 (aspheric surface)

$d_{15}$=13.4571

$r_{16}$=−137.5555

$d_{16}$=1.4000 $nd_{10}$=1.92286 $vd_{10}$=20.88

$r_{17}$=−252.3951

$d_{17}$=40.6970 (wide angle edge) to 14.0261 (intermediate position) to 1.5000 (telephoto edge)

$r_{18}$=113.0406

$d_{18}$=5.2838 $nd_{11}$=1.61800 $vd_{11}$=63.39

$r_{19}$=−98.7983

$d_{19}$=1.7000

$r_{20}$=∞(aperture stop)

$d_{20}$=1.7000

$r_{21}$=36.3568

$d_{21}$=9.5000 $nd_{12}$=1.49700 $vd_{12}$=81.61

$r_{22}$=−67.3140

$d_{22}$=3.0000 $nd_{13}$=1.71736 $vd_{13}$=29.50

$r_{23}$=96.8404

$d_{23}$=13.5679

$r_{24}$=−91.3000

$d_{24}$=2.3000 $nd_{14}$=1.80809 $vd_{14}$=22.76

$r_{25}$=−39.7728

$d_{25}$=1.4300 $nd_{15}$=1.69350 $vd_{15}$=53.20

$r_{26}$=41.0718 (aspheric surface) (effective diameter φ25.6)

$d_{26}$=10.0244

$r_{27}$=75.9182

$d_{27}$=8.0000 $nd_{16}$=1.61800 $vd_{16}$=63.39

$r_{28}$=−45.6371

$d_{28}$=12.1798

$r_{29}$=−27.5459

$d_{29}$=1.5000 $nd_{17}$=1.71300 $vd_{17}$=53.94

$r_{30}$=−65.7082

$d_{30}$=3.8260

$r_{31}$=127.8003

$d_{31}$=5.5000 $nd_{18}$=1.56883 $vd_{18}$=56.04

$r_{32}$=−96.1226

$d_{32}$=48.305

$r_{33}$=∞ (imaging plane)

Constant of Cone (K) and Aspheric Coefficients (A, B, C, D, E, F)
(Fourteenth Plane)

$K$=−5.6100, $A$=0, $B$=−6.34506×10$^{-9}$, $C$=−2.39141×10$^{-9}$, $D$=1.90231×10$^{-11}$, $E$=−4.99934×10$^{-14}$, $F$=4.49558×10$^{-17}$ (Fifteenth Plane)

$K$=−0.6649, $A$=0, $B$=2.19580×10$^{-7}$, $C$=−3.02130×10$^{-9}$, $D$=2.14493×10$^{-11}$, $E$=−5.34576×10$^{-14}$, $F$=4.66441×10$^{-17}$ (Twenty-Sixth Plane)

$K$=−1.3886, $A$=0, $B$=−1.07914×10$^{-6}$, $C$=−2.70333×10$^{-9}$, $D$=4.27338×10$^{-12}$, $E$=−7.70848×10$^{-15}$, $F$=0

Figure 6:
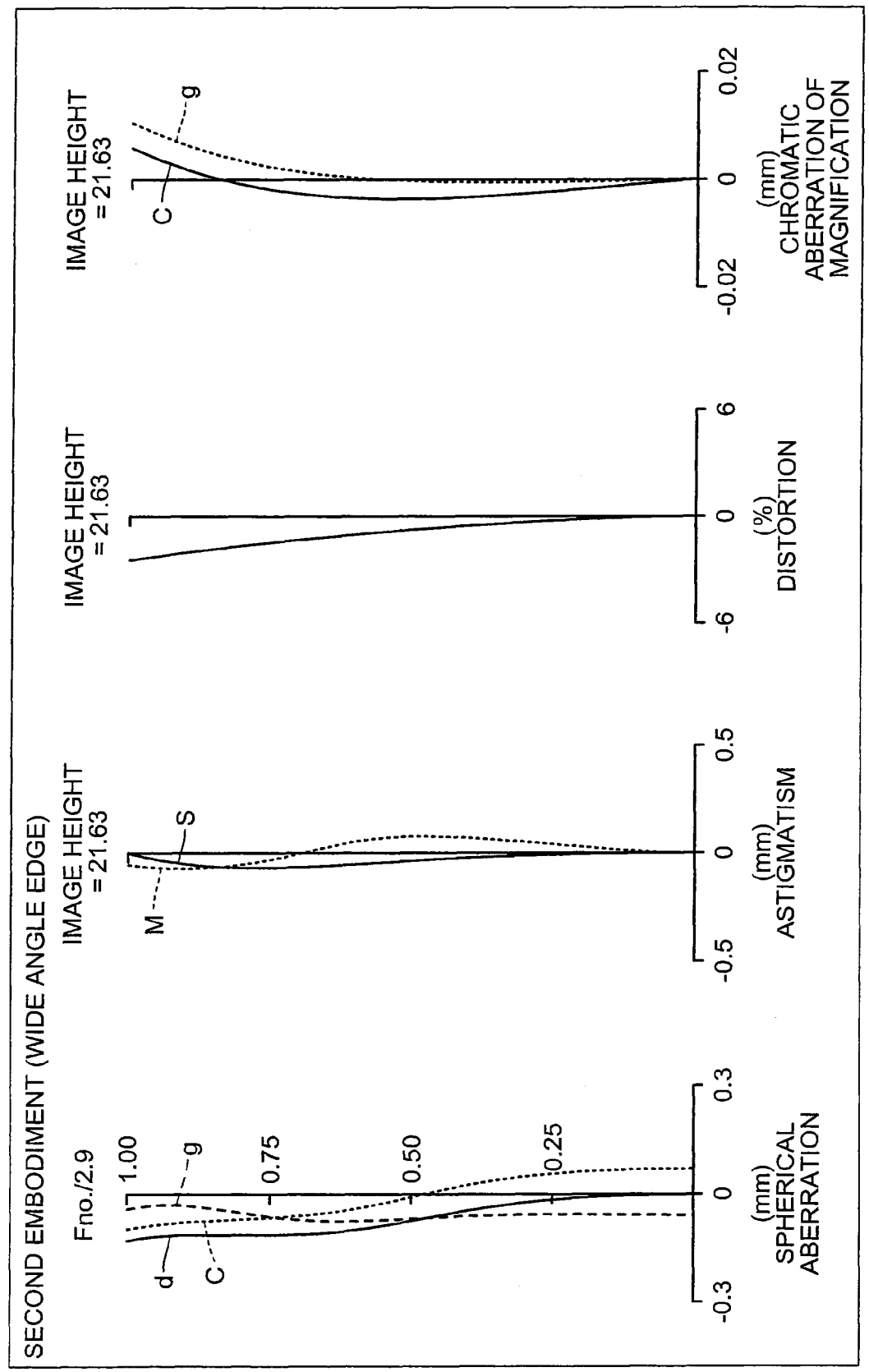
FIG. 6 is a diagram of various types of aberration at the wide angle edge of the zoom lens of the second embodiment according to the invention.
Figure 7:
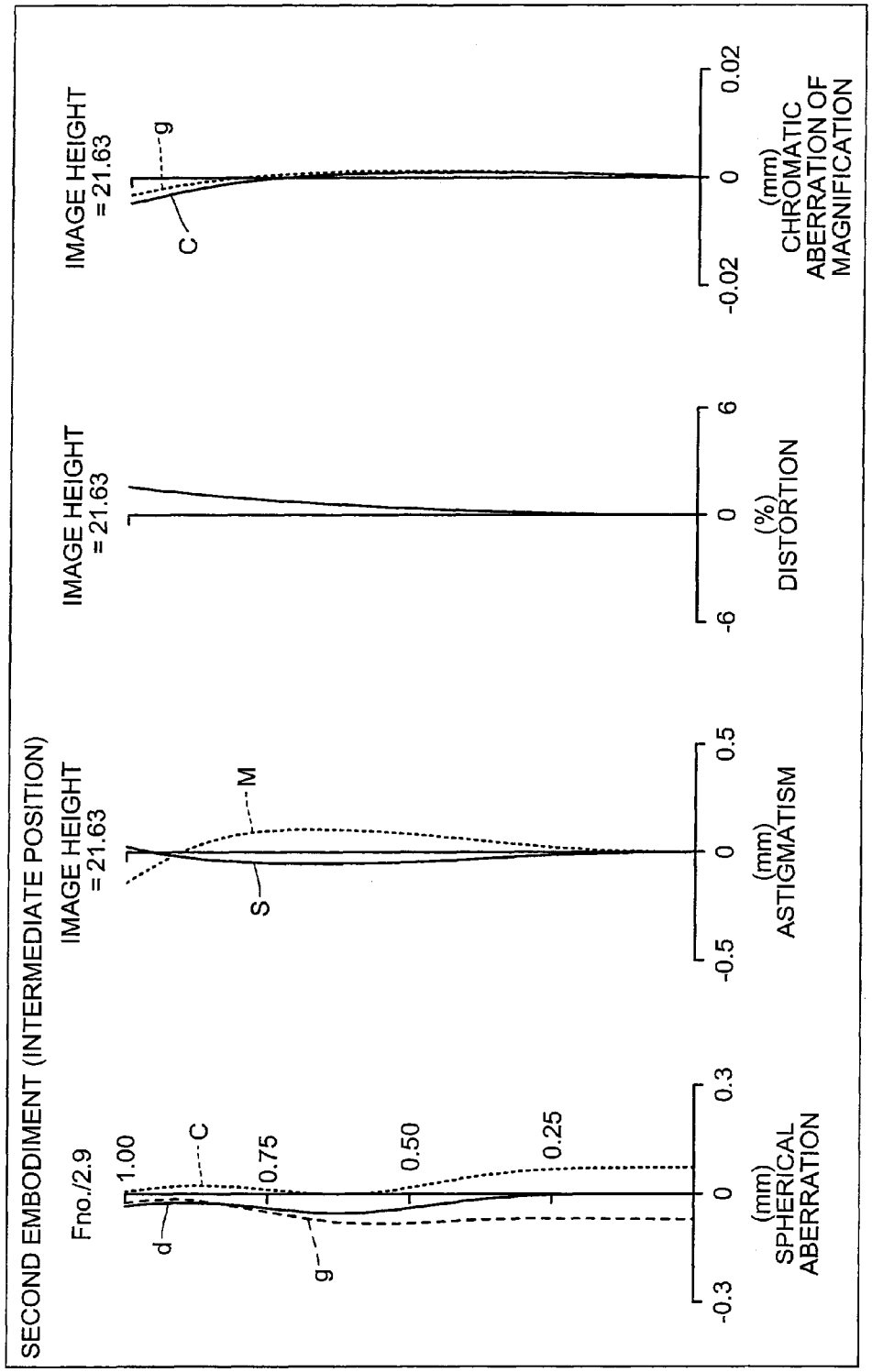
FIG. 7 is a diagram of various types of aberration at the intermediate position of the zoom lens of the second embodiment according to the invention.
Figure 8:
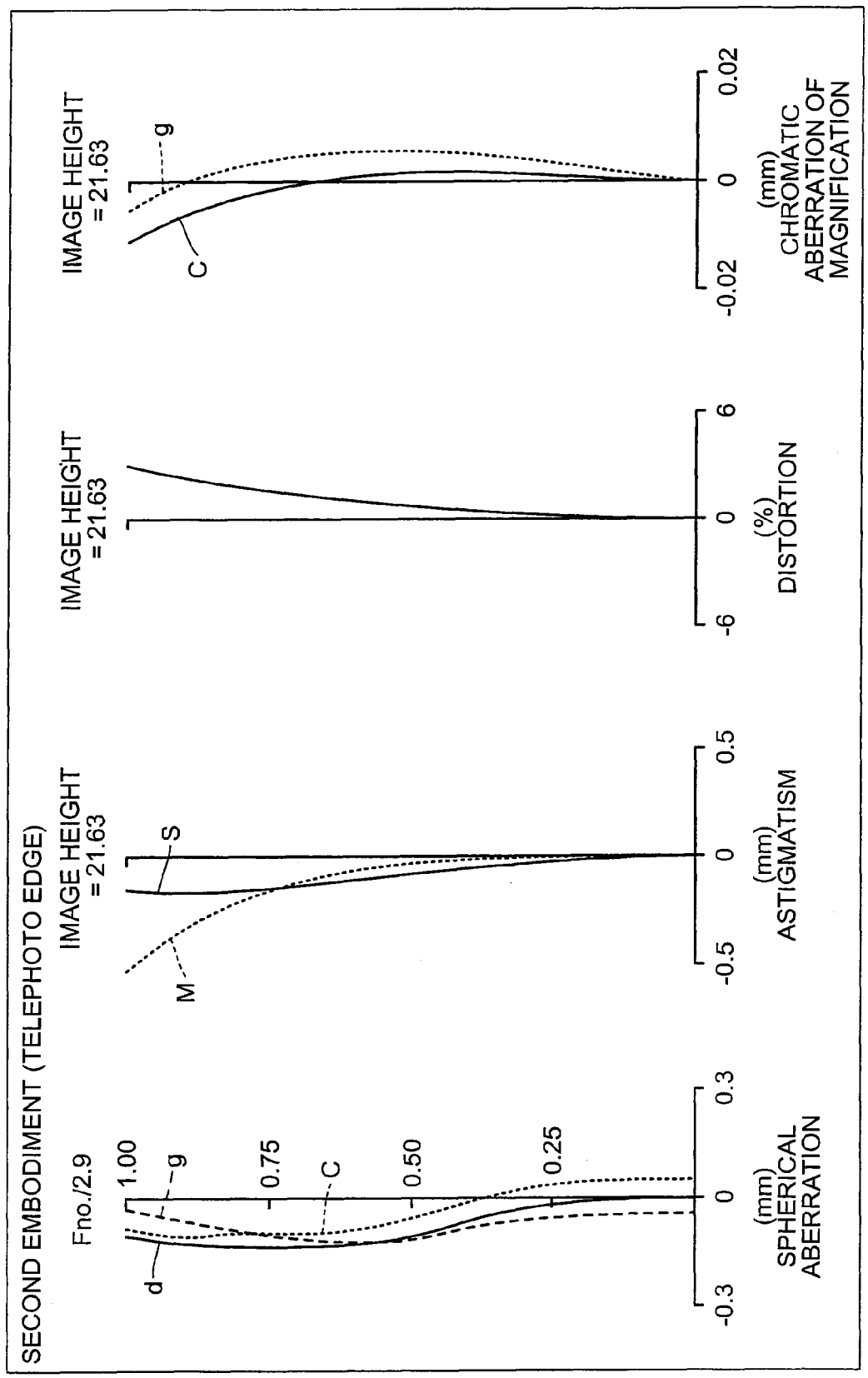
FIG. 8 is a diagram of various types of aberration at the telephoto edge of the zoom lens of the second embodiment according to the invention.

FIG. 6 is a diagram of various types of aberration at the wide angle edge of the zoom lens of the second embodiment according to the invention; FIG. 7 is a diagram of various types of aberration at the intermediate position of the zoom lens of the second embodiment according to the invention; and FIG. 8 is a diagram of various types of aberration at the telephoto edge of the zoom lens of the second embodiment according to the invention. In the diagrams, g, d, and C represent wavelength aberration corresponding to the g-line (λ=435.83 nm), the d-line (λ=587.56 nm), and the C-line (λ=656.27 nm), respectively; and ΔS and ΔM in a portion depicting astigmatism, indicate aberration with respect to a sagittal image plane and a meridional image plane, respectively.

Figure 9:
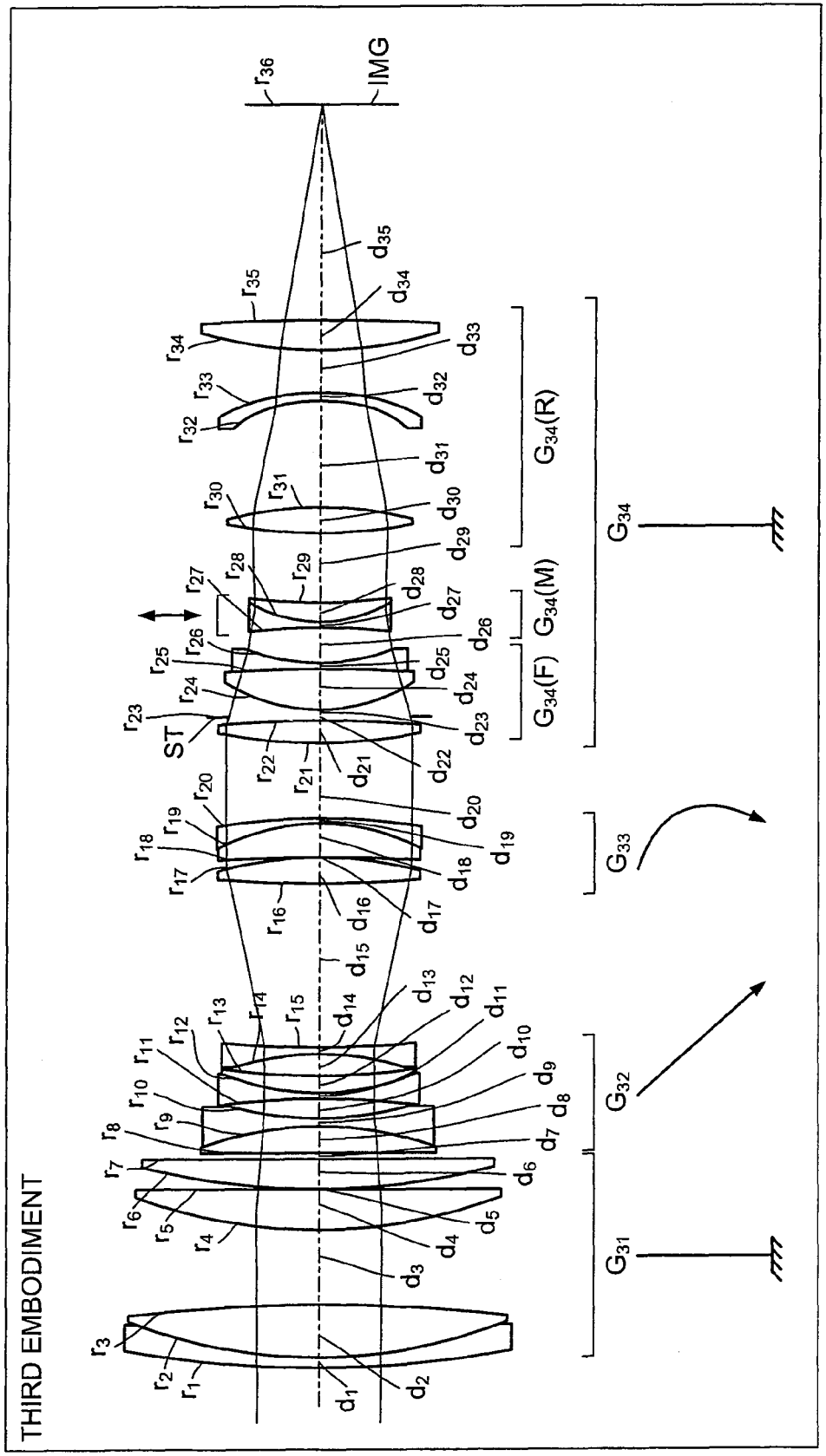
FIG. 9 depicts a cross-sectional view (along the optical axis) of the zoom lens according to a third embodiment.

FIG. 9 depicts a cross-sectional view (along the optical axis) of the zoom lens according to a third embodiment. The zoom lens includes sequentially from an object side (object not depicted), a first lens group $G_{31}$ having a positive refractive power, a second lens group $G_{32}$ having a negative refractive power, a third lens group $G_{33}$ having a positive refractive power, and a fourth lens group $G_{34}$ having a positive refractive power. Further, at the imaging plane IMG, the light receiving surface of an imaging element, such as a CCD and CMOS, is disposed.

The fourth lens group $G_{34}$ consists of, sequentially from the object side, a front group $G_{34}(F)$ having a positive refractive power, an intermediate group $G_{34}(M)$ configured by a cemented lens formed by a negative lens and a positive lens and having an overall refractive power that is negative, and a rear group $G_{34}(R)$ having a positive refractive power. In the front group $G_{34}(F)$, the aperture stop ST prescribing a given aperture is disposed. Further, in the intermediate group $G_{34}(M)$, the surface farthest on the imaging plane IMG side is formed to be aspheric.

The zoom lens, by uniformly moving the second lens group $G_{32}$ and the third lens group $G_{33}$ in a direction along the optical axis, zooms from the wide angle edge to the telephoto edge. Further, by moving a portion of the third lens group $G_{33}$ in a direction along the optical axis, the zoom lens performs focusing and by moving the intermediate group $G_{34}(M)$ in a direction substantially orthogonal to the optical axis, corrects blur (performs anti-blur).

Various values related to the zoom lens according to the third embodiment are indicated below.

Focal length (mm) of entire zoom lens=71.50 (wide angle edge) to 117.50 (intermediate position) to 194.0 (telephoto edge)
Focal length (mm) of first lens group $G_{31}$=116.472
Focal length (mm) of second lens group $G_{32}$=−33.989
Focal length (mm) of third lens group $G_{33}$=95.458
Focal length (mm) of fourth lens group $G_{34}$=101.417
F number=2.9 (wide angle edge) to 2.9 (intermediate state) to 2.9 (telephoto edge)
Angle of view (2ω)=34.66° (wide angle edge) to 20.71° (intermediate state) to 12.48° (telephoto edge)
Zoom ratio=2.713
(Values Related to Conditional Expression (1))
Overall optical system focal length (Ft) (mm), at telephoto edge, in infinity focus state=194.0
Focal length (F4F) (mm) of front group $G_{34}(F)$=80.447
Focal length (F4M) (mm) of intermediate group $G_{34}(M)$=−53.233
Focal length (F4R) (mm) of rear group $G_{34}(R)$=67.250

|Ft×F4M/(F4F×F4R)|=1.9082

(Values Related to Conditional Expression (2))
Lateral magnification ($\beta M$) of intermediate group $G_{34}(M)$, at telephoto edge=−13.442
Lateral magnification ($\beta R$) of rear group $G_{34}(R)$, at telephoto edge=−0.092

$AT=-1.3287$ (Where, $AT=(1-\beta M)\times\beta R$)
(Values Related to Conditional Expression (3))
Deviation ($\Delta S$) of paraxial radius of curvature at height of effective diameter of aspheric surface of intermediate group $G_{34}(M)$ and aspheric surface shape=−0.0554
Effective diameter ($\phi S$) of aspheric surface of intermediate group $G_{34}(M)$=26.6

$|100\times\Delta S/\phi S|=0.2083$ $r_1=260.8335$ $d_1=2.0000\ nd_1=1.90366\ vd_1=31.31$ $r_2=96.5008$ $d_2=10.0000\ nd_2=1.49700\ vd_2=81.61$ $r_3=-536.8467$ $d_3=13.9737$ $r_4=101.3178$ $d_4=7.6000\ nd_3=1.48749\ vd_3=70.44$ $r_5=-2665.6863$ $d_5=0.2000$ $r_6=138.3704$ $d_6=5.8000\ nd_4=1.48749\ vd_4=70.44$ $r_7=32778.0796$ $d_7=1.7344$ (wide angle edge) to 26.1822 (intermediate position) to 41.4529 (telephoto edge)

$r_8=-535.6803$ $d_8=4.4879\ nd_5=1.84666\ vd_5=23.78$ $r_9=-73.5688$ $d_9=1.2000\ nd_6=1.49700\ vd_6=81.61$ $r_{10}=58.3764$ $d_{10}=3.3638$ $r_{11}=-335.6856$ $d_{11}=1.2000\ nd_7=1.61800\ vd_7=63.39$ $r_{12}=54.7363$ $d_{12}=3.1182\ nd_8=1.92286\ vd_8=20.88$ $r_{13}=131.0940$ $d_{13}=3.9834$ $r_{14}=-60.4808$ $d_{14}=1.2000\ nd_9=1.90366\ vd_9=31.31$ $r_{15}=201.8372$ $d_{15}=32.3700$ (wide angle edge) to 20.7934 (intermediate position) to 1.2000 (telephoto edge)

$r_{16}=140.2250$ $d_{16}=5.0000\ nd_{10}=1.49700\ vd_{10}=81.61$ $r_{17}=-80.4431$ $d_{17}=0.2000$ $r_{18}=-364.7242$ $d_{18}=6.5000\ nd_{11}=1.61800\ vd_{11}=63.39$ $r_{19}=-40.5605$ $d_{19}=1.2000\ nd_{12}=1.83481\ vd_{12}=42.72$ $r_{20}=-104.6322$ $d_{20}=14.2588$ (wide angle edge) to 1.3876 (intermediate position) to 5.7103 (telephoto edge)

$r_{21}=79.9122$ $d_{21}=4.8884\ nd_{13}=1.83481\ vd_{13}=42.72$ $r_{22}=-305.5741$ $d_{22}=1.1000$ $r_{23}=\infty$ (aperture stop)

$d_{23}=0.9000$ $r_{24}=30.3564$ $d_{24}=8.0000\ nd_{14}=1.49700\ vd_{14}=81.61$ $r_{25}=-900.4981$ $d_{25}=1.2000\ nd_{15}=1.80518\ vd_{15}=25.46$ $r_{26}=39.2300$ $d_{26}=6.8611$ $r_{27}=-123.2542$ $d_{27}=1.2000\ nd_{16}=1.80610\ vd_{16}=40.73$ $r_{28}=28.0015$ $d_{28}=3.5000\ nd_{17}=1.82115\ vd_{17}=24.06$ $r_{29}=65.2493$ (aspheric surface) (effective diameter $\phi 26.6$)

$d_{29}=14.3219$ $r_{30}=173.5739$ $d_{30}=4.5000\ nd_{18}=1.88300\ vd_{18}=40.80$ $r_{31}=-88.7106$ $d_{31}=21.2945$ $r_{32}=-29.1676$ $d_{32}=1.2000\ nd_{19}=1.80518\ vd_{19}=25.46$ $r_{33} = -40.5665$ $d_{33} = 8.0346$ $r_{34} = 81.7278$ $d_{34} = 6.0000$ $nd_{20} = 1.61800$ $vd_{20} = 63.39$ $r_{35} = -549.0507$ $d_{35} = 42.610$ $r_{36} = \infty$ (imaging plane)

Constant of Cone (K) and Aspheric Coefficients (A, B, C, D, E, F)
(Twenty-Ninth Plane)

Figure 10:
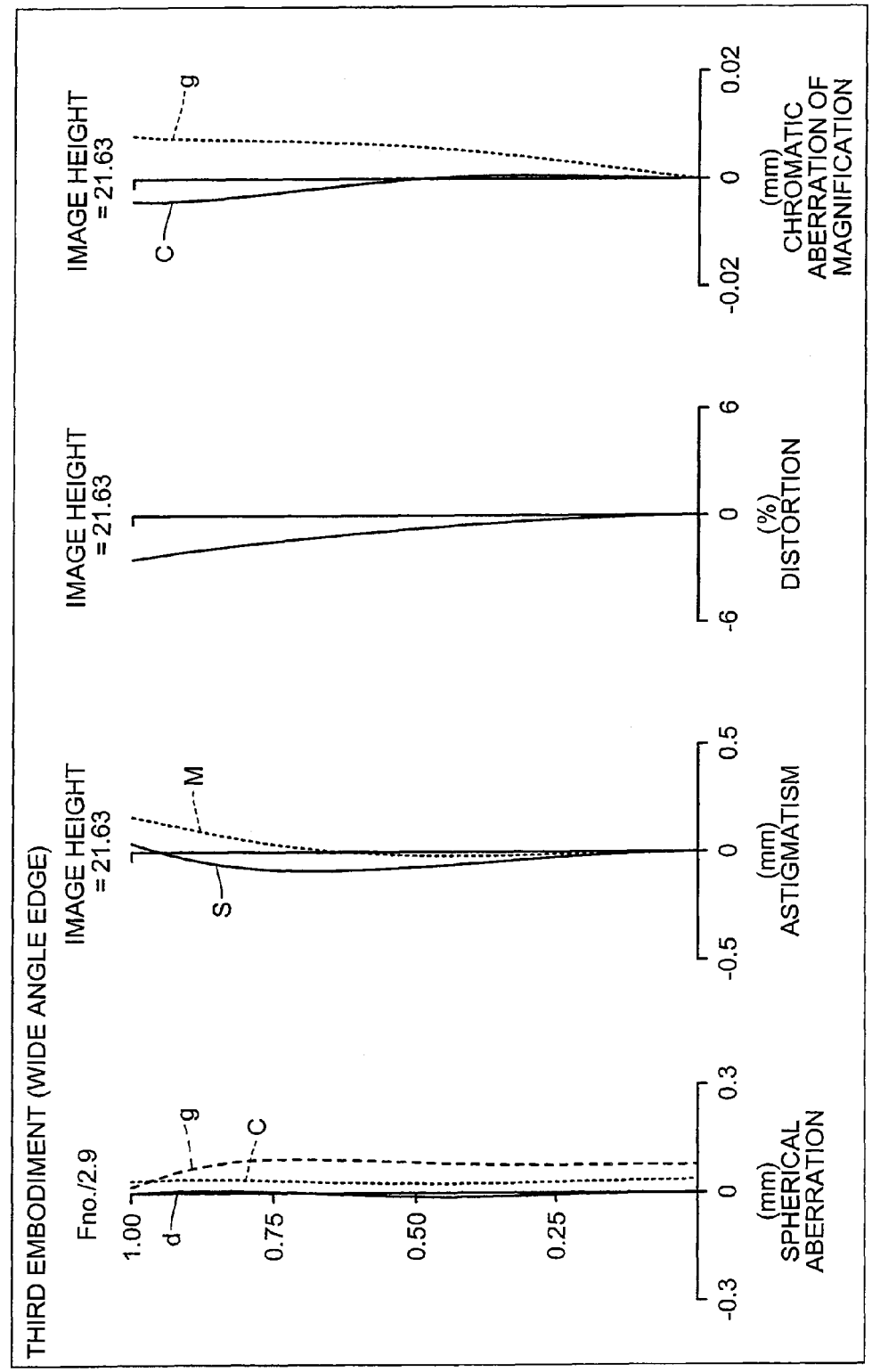
FIG. 10 is a diagram of various types of aberration at the wide angle edge of the zoom lens of the third embodiment according to the invention.
Figure 11:
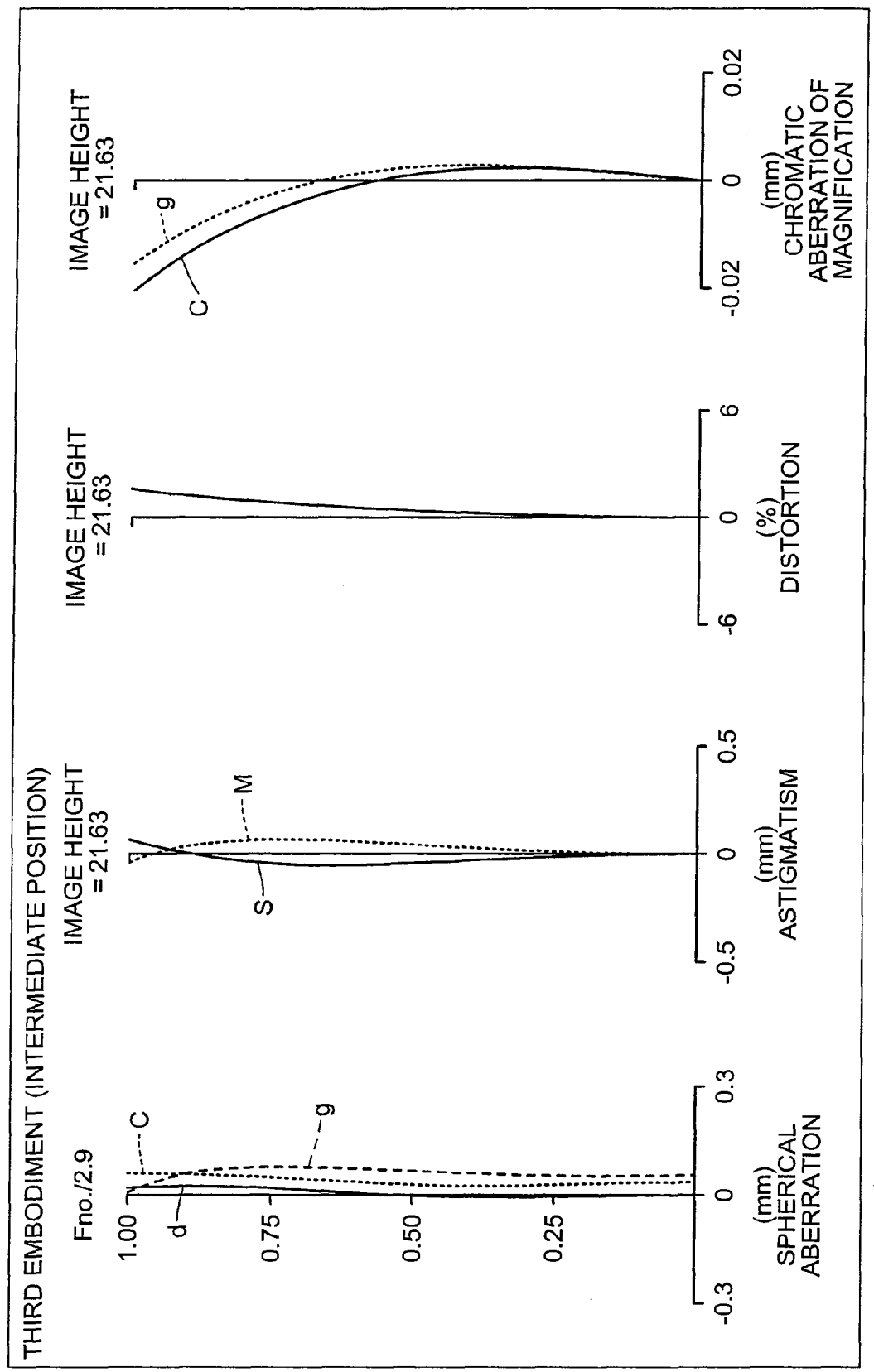
FIG. 11 is a diagram of various types of aberration at the intermediate position of the zoom lens of the third embodiment according to the invention.
Figure 12:
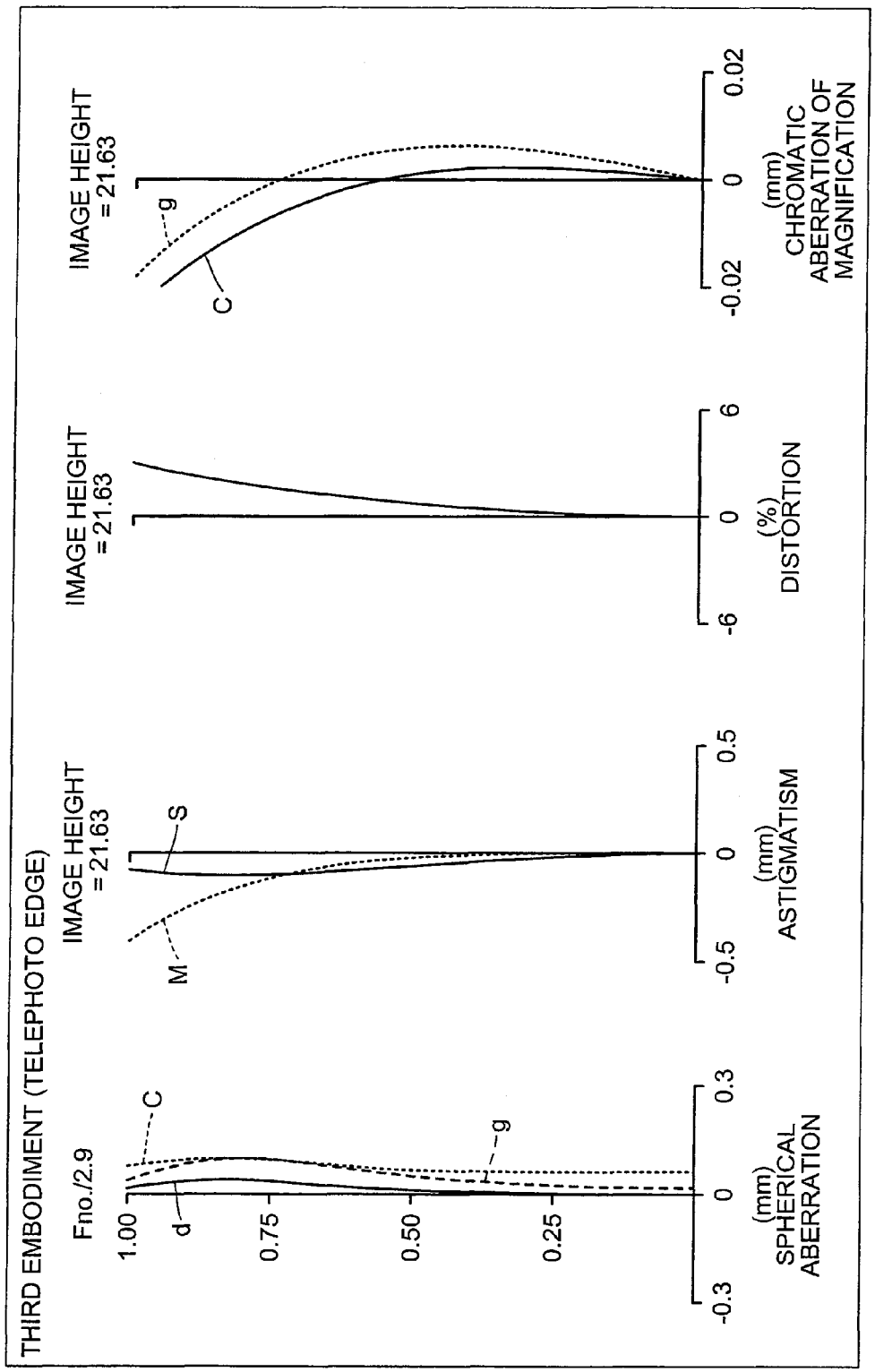
FIG. 12 is a diagram of various types of aberration at the telephoto edge of the zoom lens of the third embodiment according to the invention.

$K = -0.8792$, $A = 0, B = -1.16677 \times 10^{-6}$, $C = -6.37406 \times 10^{-10}, D = -4.56666 \times 10^{-12}$, $E = 1.02081 \times 10^{-14}, F = 0$ FIG. 10 is a diagram of various types of aberration at the wide angle edge of the zoom lens of the third embodiment according to the invention; FIG. 11 is a diagram of various types of aberration at the intermediate position of the zoom lens of the third embodiment according to the invention; and FIG. 12 is a diagram of various types of aberration at the telephoto edge of the zoom lens of the third embodiment according to the invention. In the diagrams, g, d, and C represent wavelength aberration corresponding to the g-line ($\lambda = 435.83$ nm), the d-line ($\lambda = 587.56$ nm), and the C-line ($\lambda = 656.27$ nm), respectively; and $\Delta S$ and $\Delta M$ in a portion depicting astigmatism, indicate aberration with respect to a sagittal image plane and a meridional image plane, respectively.

Among the values for each of the embodiments above, $r_1$, $r_2$, . . . indicate radii of curvature for each lens, diaphragm surface, etc.; $d_1, d_2, \ldots$ indicate the thickness of the lenses, diaphragm, etc. or the distance between surfaces thereof; $nd_1$, $nd_2, \ldots$ indicate the refraction index of each lens with respect to the d-line ($\lambda = 587.56$ nm); and $vd_1, vd_2, \ldots$ indicate the Abbe number with respect to the d-line ($\lambda = 587.56$ nm) of each lens.

Each of the aspheric surfaces above can be expressed by equation [1], where Z is aspheric surface depth, y is the height from the optical axis, and the travel direction of light is positive.

$$Z = \frac{y^2}{R\left(1 + \sqrt{1 - (1+K)y/R^2}\,\right)^2} + Ay^2 + By^4 + Cy^6 + Dy^8 + Ey^{10} + Fy^{12} \quad [1]$$

Where, R is the paraxial radius of curvature; K is the constant of the cone; and A, B, C, D, E, F are the second, fourth, sixth, eighth, tenth, and twelfth aspheric coefficients, respectively.

In the embodiments, the invention is applied and examples configuring a large diameter, internal focusing telephoto zoom lens having at the wide angle edge, a focal length of 72 mm or less, a zoom ratio of 2.7× or more and an F number of 3 or less. As shown in these embodiments, by satisfying the conditions above, reductions in the size, weight and the anti-blur shift amount of the anti-blur group are facilitated, whereby even with a small actuator, blur correction can be performed quickly. Actuator power savings can also be promoted, without deterioration of optical performance. Further, the zoom lens of each of the embodiments employs a lens having a suitable aspheric surface, whereby favorable optical performance can be maintained with fewer lenses.

Additionally, according to the present invention, the optical performance of the anti-blur group can be improved.

According to the present invention, a zoom lens is effected that maintains high optical performance; facilitates reductions in the size, weight, and the anti-blur shift amount of the anti-blur group; and has an excellent blur correction function.

As described, the zoom lens of the present invention is useful in imaging apparatuses such as DSMCs and single-lens reflex cameras, and is particularly ideal when quick blur correction is demanded.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2010-203703 filed in Japan on Sep. 10, 2010.

What is claimed is:

1. A zoom lens comprises sequentially from an object side:
a first lens group having a positive refractive power;
a second lens group having a negative refractive power;
a third lens group having a positive refractive power; and
a fourth lens group having a positive refractive power, wherein
zoom is performed by moving the second lens group and the third lens group along an optical axis,
the fourth lens group consists of, sequentially from the object side, a front group having a positive refractive power, an intermediate group consisting of only a cemented lens formed by a positive lens and a negative lens or a cemented lens formed by a negative lens and a positive lens and having an overall refractive power that is negative, and a rear group having a positive refractive power,
blur is corrected by moving the intermediate group in a direction that is substantially orthogonal to the optical axis, and
a conditional expression (1) 1.85<|Ft×F4M/(F4F×F4R)|<4 is satisfied, where Ft represents overall optical system focal length, at a telephoto edge, in an infinity focus state, F4F represents the focal length of the front group of the fourth lens group, F4M represents the focal length of the intermediate group of the fourth lens group, and F4R represents the focal length of the rear group of the fourth lens group.

2. The zoom lens according to claim 1, wherein |Ft×F4M/(F4F×F4R)| is greater than or equal to 1.9082 and less than or equal to 2.3712.

3. A zoom lens comprises sequentially from an object side:
a first lens group having a positive refractive power;
a second lens group having a negative refractive power;
a third lens group having a positive refractive power; and
a fourth lens group having a positive refractive power, wherein
zoom is performed by moving the second lens group and the third lens group along an optical axis,
the fourth lens group consists of, sequentially from the object side, a front group having a positive refractive power, an intermediate group configured by a cemented lens formed by a positive lens and a negative lens or a cemented lens formed by a negative lens and a positive lens and having an overall refractive power that is negative, and a rear group having a positive refractive power, blur is corrected by moving the intermediate group in a direction that is substantially orthogonal to the optical axis, a conditional expression (1) $1.85 < |Ft \times F4M/(F4F \times F4R)| < 4$ is satisfied, where Ft represents overall optical system focal length, at a telephoto edge, in an infinity focus state, F4F represents the focal length of the front group of the fourth lens group, F4M represents the focal length of the intermediate group of the fourth lens group, and F4R represents the focal length of the rear group of the fourth lens group, and a conditional expression (2) $-2.0 < AT < -1.3$ is satisfied, where AT is an anti-blur coefficient of the intermediate group of the fourth lens group at the telephoto edge, $AT = (1-\beta M) \times \beta R$, $\beta M$ represents lateral magnification of the intermediate group of the fourth lens group, at the telephoto edge, and $\beta R$ represents lateral magnification of the rear group of the fourth lens group at the telephoto edge.

4. The zoom lens according to claim 3, wherein at least one surface of the intermediate group of the fourth lens group is aspheric, the aspheric surface, compared to a spherical surface having a paraxial radius of curvature, has a shape where a positive refractive power toward the lens periphery increases or a negative refractive power decreases, and a conditional expression (3) $0.1 < |100 \times \Delta S/\phi S| < 1.0$ is satisfied, where $\Delta S$ represents a deviation of the paraxial radius of curvature at a height of the effective diameter of the aspheric surface of the intermediate group and aspheric surface shape and $\phi S$ represents an effective diameter of the aspheric surface of the intermediate group.

* * * * *